(No Model.)
M. HAUGHEY.
INTERFERING DEVICE FOR HORSES.
No. 379,644. Patented Mar. 20, 1888.
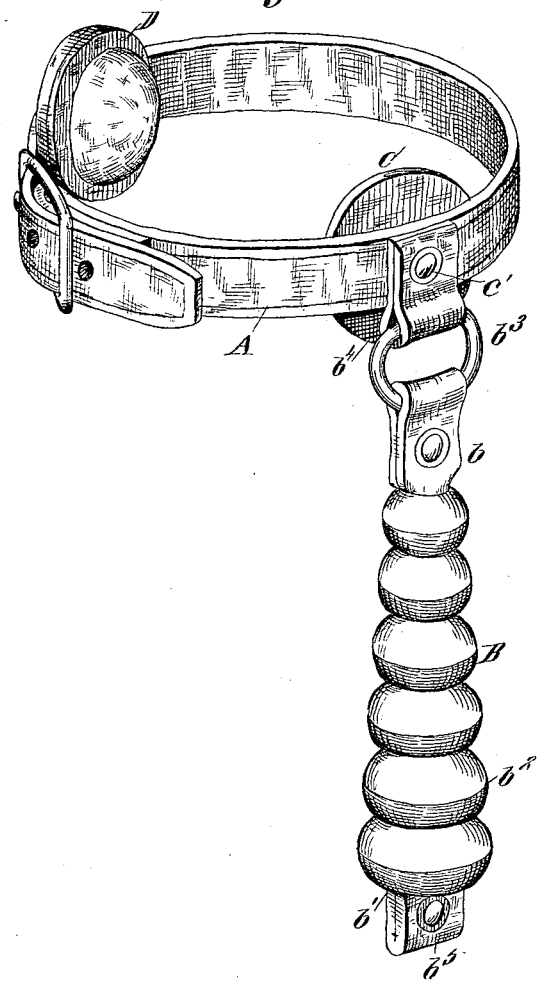
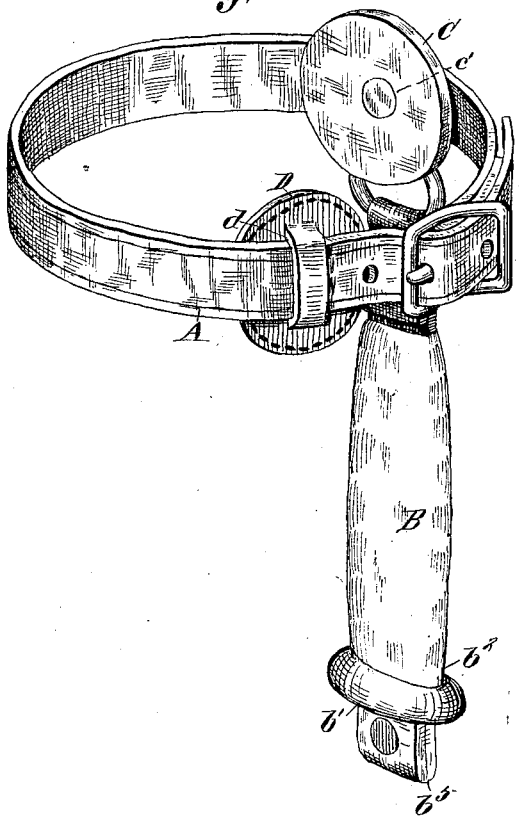
Attest:
Edward J. O'Brien
Charles Pickles
Inventor:
Michael Haughey

UNITED STATES PATENT OFFICE.

MICHAEL HAUGHEY, OF ST. LOUIS, MISSOURI.

INTERFERING DEVICE FOR HORSES.

SPECIFICATION forming part of Letters Patent No. 379,644, dated March 20, 1888.

Application filed September 22, 1887. Serial No. 250,462. (No model.)

*To all whom it may concern:*

Be it known that I, MICHAEL HAUGHEY, a citizen of the United States, residing at the city of St. Louis, in the State of Missouri, have invented a new and useful Improvement in Devices to Prevent Horses Interfering, of which the following is a specification.

My invention relates to an improvement in interfering straps or devices that are fastened on the horse's legs at or near the point where the horse may strike or interfere while moving about, usually above the pastern-joint; and the object of my improvement is, first, to provide against a horse striking or interfering, by means of a pendant that will move and swing freely between his legs from a loose joint at one or more points of attachment to a strap fastened around his leg; second, to provide means for holding the pendant on the horse's leg in any desired position that it may be placed in, and, third, to reduce the friction incidental to the act of striking. I attain these objects by the mechanism illustrated in the accompanying drawings, in which—

Figure 1 is a perspective view of my improvement, and Fig. 2 a similar view of the same, showing another form of swinging pendant.

Similar letters refer to similar parts in both figures.

Of the several modes of providing against the injury to an animal caused by repeated striking of the legs—the one against the other—and commonly called "interfering," the aim in all of them appears to be merely to afford protection to the parts of contact without regard to effecting a permanent cure, whereby the use of an interfering-strap will be rendered unnecessary. This latter object is attained by the use of my device, inasmuch as the motion of the horse's legs has the effect of giving to the pendant a swinging tangential motion, whereby the leg opposite to the one provided with my strap is touched before contact or conjunction of the two limbs with the pendant between, and the information thus communicated has the effect upon the horse of making him strive to avoid the touch of the swinging pendant. This he can only do by moving with his legs spread sufficiently apart to avoid it, and in this way he soon loses the habit of striking.

In the drawings, A, Fig. 1, is a plain leather strap provided with an ordinary buckle or means for fastening the same around the leg of a horse. Upon the inside and near the buckle end of said strap I attach a small disk, C, made of leather or other suitable material, and fasten the same in place with the rivet $c'$. D is another disk similar to C, and facing on the inside of the strap A, to which it is attached by a loop, $d$, passing around said strap, or otherwise, so as to slide freely on the same. It is also padded or raised on the inside, so as to fit the depressions in the horse's leg, and thus hold the parts in place.

B is the pendant, which consists of the stem $b^5$, lugs $b$ and $b'$, ring $b^3$, and annular sections $b^2$. These annular sections have an opening in their middle to admit them on the stem $b^5$, and they may be made of rubber, leather, wood, or other suitable material. This form, however, is not essential, as the pendant may be made in one piece loosely fastened at the top. The upper end of the stem $b^5$ is lapped around the ring $b^3$ and fastened, and the whole is loosely attached to the strap A by a strip, $b^4$, passing around the ring $b^3$, and fastened to the strap A by the rivet $c'$.

Having thus fully described my invention, what I claim as new, and desire to secure by Letters Patent, is—

The interfering device consisting of the pendant made of rubber, wood, or other suitable material, loosely jointed to the strap passing around the leg of a horse, substantially in the manner shown, and for the purposes set forth.

MICHAEL HAUGHEY.

Witnesses:
THOMAS BLUNDELL,
EDWARD J. O'BRIEN.